United States Patent [19]

Klaila

[11] E Re. 31,241

[45] Reissued May 17, 1983

[54] METHOD AND APPARATUS FOR CONTROLLING FLUENCY OF HIGH VISCOSITY HYDROCARBON FLUIDS

[75] Inventor: William J. Klaila, Middleboro, Mass.

[73] Assignee: Electromagnetic Energy Corporation, Middleboro, Mass.

[21] Appl. No.: 110,666

[22] Filed: Jan. 9, 1980

Related U.S. Patent Documents

Reissue of:

[64] Patent No.: 4,067,683
Issued: Jan. 10, 1978
Appl. No.: 696,063
Filed: Jun. 14, 1976

[51] Int. Cl.[3] ..... F23D 11/44

[52] U.S. Cl. ..... 431/11; 219/10.55 R; 431/37; 431/208

[58] Field of Search ..... 431/11, 36, 37, 38, 431/39, 41, 208; 219/10.65, 10.55 R, 10.55 M

[56] References Cited

U.S. PATENT DOCUMENTS

| | | | |
|---|---|---|---|
| 2,685,930 | 8/1954 | Albough | 166/39 |
| 2,753,928 | 7/1956 | Vanderlip . | |
| 2,757,738 | 8/1956 | Ritchey | 166/39 |
| 3,092,514 | 6/1963 | Tomberlin . | |
| 3,104,711 | 9/1963 | Haagensen . | |
| 3,133,592 | 5/1964 | Tomberlin . | |
| 3,170,519 | 2/1965 | Haagensen | 166/60 |
| 3,208,674 | 9/1965 | Bailey | 166/248 |
| 3,428,125 | 2/1969 | Parker | 166/248 |
| 3,462,575 | 8/1969 | Holaday | 219/10.55 |
| 3,535,482 | 10/1970 | Kluck . | |
| 3,702,386 | 11/1972 | Foerstner | 219/10.55 |
| 3,718,186 | 2/1973 | Brandon . | |
| 3,748,421 | 7/1973 | Peterson | 219/10.55 |
| 3,778,578 | 12/1973 | Long et al. . | |
| 3,812,315 | 5/1974 | Martin . | |
| 3,891,817 | 6/1975 | Brown . | |
| 3,920,945 | 11/1975 | Smith et al. . | |
| 3,948,319 | 4/1976 | Pritchett . | |
| 3,989,107 | 11/1976 | Fisher et al. . | |
| 4,008,761 | 2/1977 | Fisher et al. . | |
| 4,008,762 | 2/1977 | Fisher et al. . | |
| 4,135,579 | 1/1979 | Rowland et al. . | |
| 4,140,179 | 2/1979 | Kasevich et al. . | |
| 4,140,180 | 2/1979 | Bridges et al. . | |

FOREIGN PATENT DOCUMENTS

| | | |
|---|---|---|
| 547388 | 10/1957 | Canada . |
| 2427031 | 12/1975 | Fed. Rep. of Germany . |

OTHER PUBLICATIONS

*Microwave Heating, in Freeze-Drying, Electronic Ovens, and Other Applications*, David A. Copson, Ph.D., 1962, p. 372.

*Electronic Progress*, vol. IX, No. 4, 1965.

*Chemistry and Industry*, Methods, Apparatus: New Product Research, Process Development and Design; Y. C. Fu, Jul. 31, 1971.

*Primary Examiner*—Edward G. Favors
*Attorney, Agent, or Firm*—Roland T. Bryan

[57] ABSTRACT

A method and apparatus for controlling *the* fluency of hydrocarbon fluids having a kinematic viscosity in the range of 350 seconds Saybolt Universal to 10,000 seconds Saybolt Universal at 100° F. Electromagnetic waves generated by a power source are directed through a dielectric medium towards a contained hydrocarbon fluid of the foregoing type. The electromagnetic energy is converted into thermal energy within the hydrocarbon fluid for controlling its fluency. *The hydrocarbon fluid whose fluency is to be controlled may be located within a geological substrate to which the electromagnetic energy is applied.*

26 Claims, 6 Drawing Figures

METHOD AND APPARATUS FOR CONTROLLING FLUENCY OF HIGH VISCOSITY HYDROCARBON FLUIDS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to electromagnetic energy heating, and more [particular] *particularly*, is directed towards methods and apparatuses for controlling the fluency of high [viscous] *viscosity* hydrocarbon fluids.

2. Description of the prior Art

Commercial and industrial oil burners have been designed for use with either distillate grades such as No. 2 and No. 4 fuel oils or residual grades such as No. 5 heavy and No. 6 fuel oils. The low viscosity distillate grades are sufficiently fluid at normal ambient temperatures for good burner operation in typical commercial and industrial installations. The high viscosity residual grades are not sufficiently fluid at normal ambient temperatures, whereby preheating and continuous circulation at temperatures above [it] *its* pour point at all stages between a storage tank and *oil* burner is required to assure pumpability. The BTU content of the residual grades is greater than that of the more highly refined distillate grades and the cost of the residual grades is less than the cost of the distillate grades. Some of the factors that have limited the use of the residual grades of fuel oil are the high labor and equipment costs in using such fuel oil as well as the preheating expenses. The use of steam, hot water, gas and electricity for preheating residual grade fuel oils has been introduced with varying degrees of success.

SUMMARY OF THE INVENTION

It is an object of the present invention to provide a method and apparatus for controlling the fluency of high viscosity contained hydrocarbon and other fluids by means of electromagnetic energy.

Another object of the invention is to provide a method and apparatus involving electromagnetic energy for controlling the fluency of contained hydrocarbon fluids having a kinematic viscosity in the approximate range of 350 seconds Saybolt Universal to 10,000 seconds Saybolt Universal at 100° F. Electromagnetic waves generated by a power source are directed through a dielectric member into a chamber containing the hydrocarbon fluid. The electromagnetic energy is converted into thermal energy within the hydrocarbon fluid for controlling its fluency.

A further object of the invention is to provide an oil burner heating system configured to use No. 5 heavy and No. 6 fuel [oil] *oils*. Electromagnetic waves generated by a source such as a magnetron are directed through a dielectric medium towards the fuel oil which is contained within a preheater. A pump is provided for delivering the heated fuel oil to the oil burner and for circulating the fuel oil between the preheater chamber and a storage tank, a temperature controller being provided for regulating the temperature of the fuel oil.

Still another object of the invention is to provide a method and apparatus involving microwave energy for on site removal of hydrocarbon fuels from geological substrates such as coal, shale, tar sand and existing oil wells.

Other objects of the present invention will in part be obvious and will in part appear hereinafter.

The invention accordingly comprises the methods, apparatuses and systems, together with their steps, parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
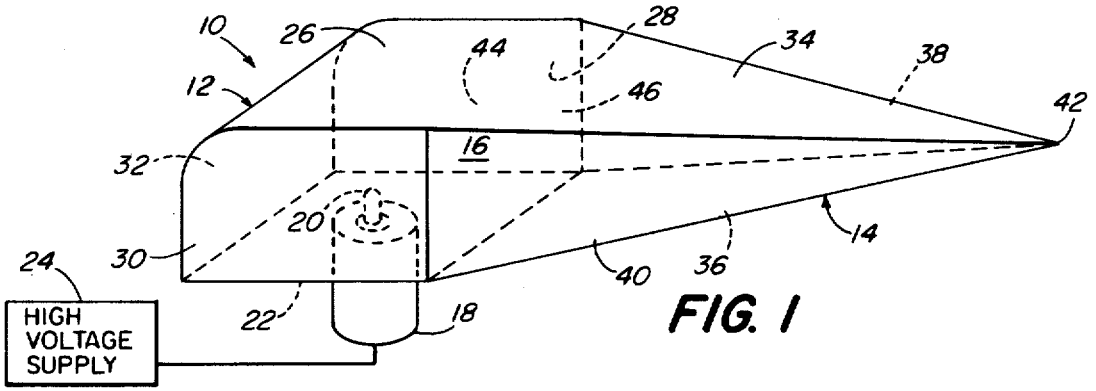
FIG. 1 is a perspective view of a microwave heater embodying the invention.

Referring now to the drawings, particularly FIG. 1, there is shown a heating apparatus 10 having a waveguide section 12 and a horn 14 which constitute an enclosure 16 that is radiated by electromagnetic energy, for example microwave energy, generated by a source 18 such as a magnetron. A probe-type antenna 20 of magnetron 18 projects through a bottom wall 22 of enclosure 16. A high voltage supply 24 is provided for energizing magnetron 18. Waveguide section 12, which includes bottom wall 22, a top wall 26, sidewalls 28, 30 and a rear wall 32, is composed of a metal such as stainless steel and defines a substantially rectangular structure having rounded corners at its upper rearward end. Horn 14, which includes a top wall 34, a bottom wall 36 and sidewalls 38, 49, defines a substantially pyramidal structure that terminates in an apex 42, the sides of the horn converging inwardly from waveguide section 12. In alternative embodiments, horn 14 has a conical or cylindrical profile. An open end or forward portion 44 of waveguide section 12 is juxtaposed with a base 46 of pyramidal horn 14, the forward end and base having congruent profiles. Horn 14, which is composed of a dielectric material that is permeable to electromagnetic energy, is provided with a [reenforced] *reinforced* outer shell such as an epoxy [reenforced] *reinforced* with glass fibers or pyroceram. In alternative embodiments, horn 14 is composed of vitreous silica such as quartz, a composition including silica and boron oxide or a tetrafluoroethelyne polymer. A heating system 48 utilizing a heating apparatus of the type just described is shown in FIGS. 2 and 3.

Figure 3:
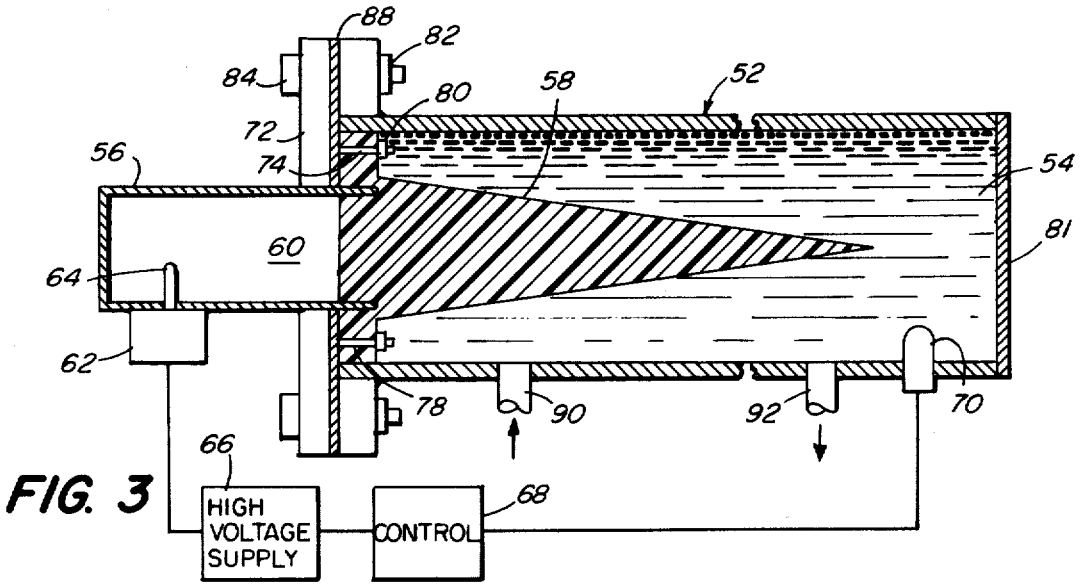
FIG. 3 is a sectional view taken along the lines 3—3 of FIG. 2.
Figure 2:
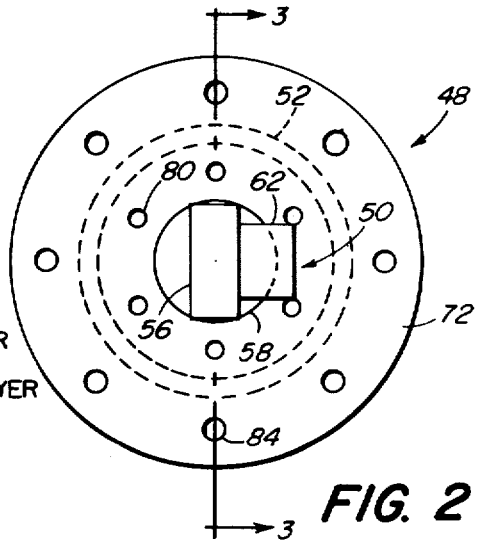
FIG. 2 is an end view of a microwave heater system.

Referring now to FIGS. 2 and 3, heating system 48 comprises a heating apparatus 50 and a tank 52 containing a fluid 54 having a kinematic viscosity in the approximate range of 350 to 10,000 seconds Saybolt Universal at 100° F. Heating apparatus 50 includes a waveguide section 56 and a horn 58 defining an enclosure 60 that is radiated by electromagnetic energy from a source 62. In the preferred embodiment, source 62 is a magnetron having a probe-type antenna 64 that projects through a bottom wall of waveguide section 56, enclosure 60 being radiated by microwave energy. A high voltage power supply 66 which is regulated by a controller 68 is provided for energization of magnetron 62. A temperature sensing device 70 extends into tank 52 and generates control signals that are applied to controller 68 for regulating the temperature of fluid 54. A flange 72 having extending studs 74 is secured to waveguide section 56 by welding for example, the studs extending parallel to [a] *the* longitudinal axis of the waveguide. Horn 58 is a hollow or solid cone composed of a dielectric material, for example a [reenforced] *reinforced* polymer such as an epoxy [reenforced] *reinforced* with glass fibers, and is provided with an integral flange 78 composed of a [reenforced] *reinforced* polymer such as an epoxy [reenforced] *reinforced* with glass fibers or pyroceram. In alternative embodiments, horn 58 is composed of a vitreous silica such as quartz, a composition including silica and boron oxide, or a tetrafluoroethylene polymer. The base of cone 58 is adjacent an open end of waveguide *section* 56. Flange 78 is configured to receive studs 74. Preferably, waveguide section 56 is pressed into horn 58. Nuts 80 are threaded onto studs 74 for holding waveguide section 56 and horn 58. Tank 52, for example an 8 inch diameter pipe sealed at one end with a plate 81, is provided with a flange 82 that is configured to mate with flange 72 of waveguide section 56. Bolts 84 and nuts 86 fasten flanges 72 and 82 together, a gasket 88 being positioned between the flanges.

Figure 4:
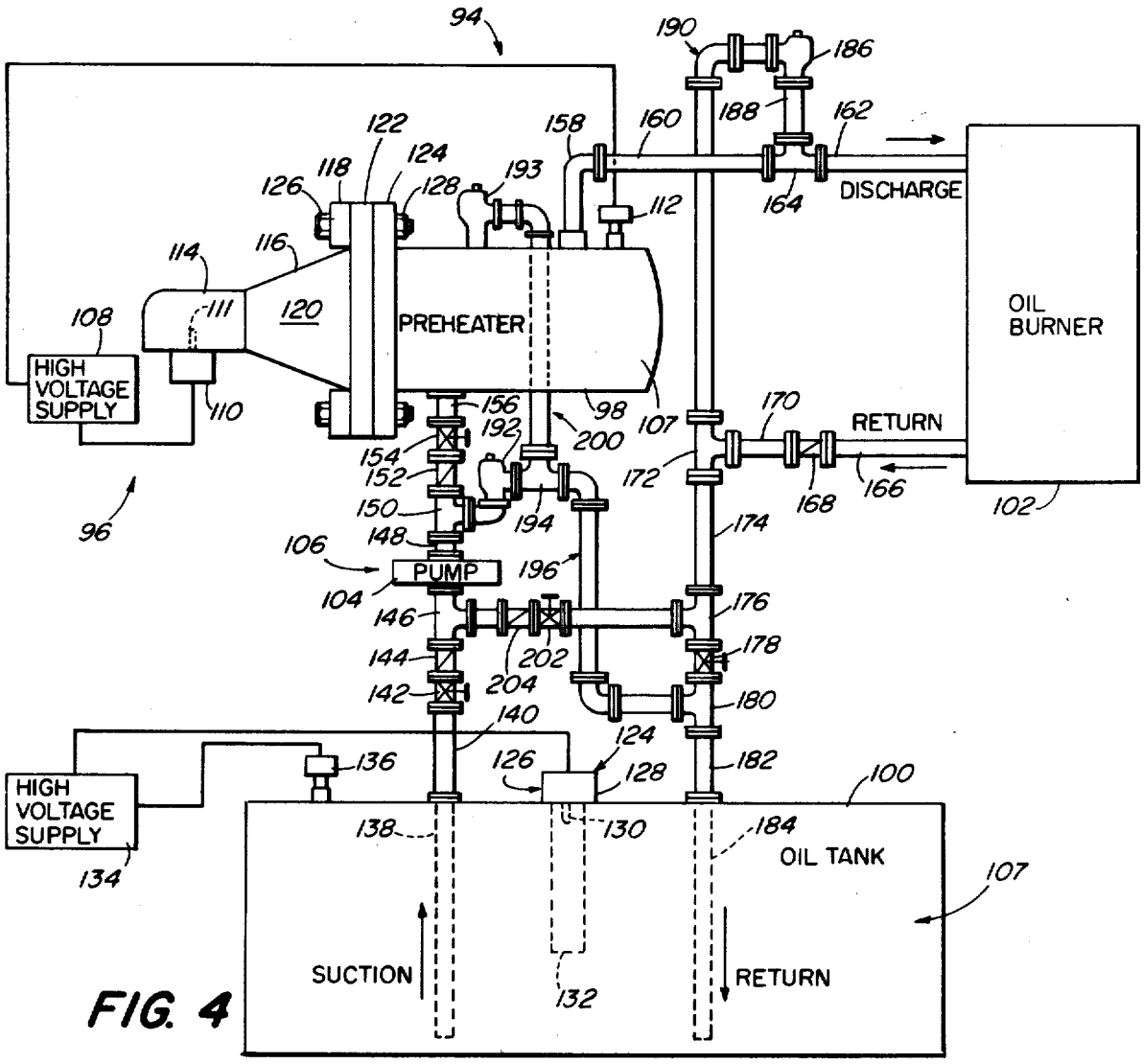
FIG. 4 is a schematic diagram of an oil burner assembly embodying the invention.
Figure 6:
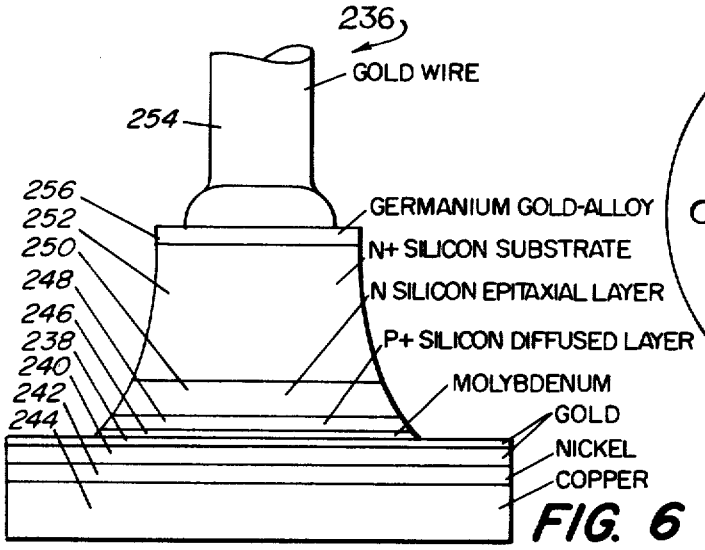
FIG. 6 is a side elevation of a solid state oscillator for generation of electromagnetic energy.

In operation of heating system 48, fluid 54 enters tank 52 through an inlet port 90 and exits the tank through an outlet port 92. Magnetron 62 is energized by high voltage supply 66 and microwave energy is radiated into [waveguide] *enclosure* 60 from probe 64. The microwave energy travels through cone 58 and is radiated into tank 52 where it is converted into thermal energy within fluid 54. As the temperature of fluid 54 rises to a predetermined level, sensor 70 generates a signal to controller 68 which deenergizes high voltage supply 66. In consequence, magnetron 62 is turned off. When the temperature of fluid 54 falls to a predetermined level, sensor 70 generates a signal to controller 68 which energizes high voltage power supply. Magnetron 62 is turned on and fluid 54 is heated. Magnetron is cycled ON and OFF for maintaining the temperature of fluid 54 within specified limits at which the viscosity of the fluid is lowered to a point where it flows easily. In this way, high viscosity fluid 54 is circulated through tank 52. An oil burner heating system 94 having a heating system of the type shown in FIGS. 2 and 3 is depicted in FIG. 4.

Oil burner system 94 comprises a heater assembly 96, a preheater chamber 98, a storage tank 100, an oil burner 102, and a pump 104 that are interconnected by a conduit control assembly 106. Oil burner 102 is configured to use hydrocarbon fluids having a viscosity in the approximate range of 350 to 10,000 seconds Saybolt Universal at 100° F., particularly No. 5 heavy and No. 6 fuel [oil] *oils*. Preheater chamber 98 and storage tank 100 contain a hydrocarbon fluid 107 of the foregoing type. Power assembly 96 includes a high voltage power supply 108 for energization of an electromagnetic energy source 110, for example a microwave energy source such as a magnetron having a probe-type antenna 111. A temperature sensor 112, which senses the temperature of fluid 107 within preheater chamber 98, generates signals that control high voltage power supply 108 and hence magnetron 110. Antenna 111 is positioned within a waveguide 114 which is connected to an outwardly tapering horn 116 having a flange 118 at its end. Waveguide 114 and horn 116 are composed of a metal such as stainless steel. Waveguide 114 and horn 116 constitute an input energy section 120 which is isolated from preheater chamber 98 by means of a plate 122 which is permeable to electromagnetic energy and impervious to fluid 107. An open end of preheater chamber 98 is provided with a flange [124] *123* which is configured to mate with flange 118 of horn 116. Bolts [126] *125* and nuts [128] *127* are provided for securing flanges 118 and [124] *123* together, plate 122 being positioned between the flanges.

An auxilliary heater 124, which is provided for heating fluid 107 in storage tank 100, includes a source 126 of electromagnetic energy, for example a microwave source such as a magnetron 128 with a probe-type antenna that projects into a sealed hollow cylindrical member 132 disposed within tank 100. A high voltage power supply 134 that is controlled by a temperature sensor 136 is provided for energization of magnetron 128.

In operation of heating system 94, high voltage power supply 108 is activated by control signals generated by sensor 112. Magnetron 110 is energized and input energy section 120 is radiated with microwave energy which passes through plate 122 and is converted into thermal energy within fluid 107 in preheater chamber 98. In addition, high voltage power supply 134 is activated by control signals generated by sensor 136. Magnetron 128 is energized and microwave energy is radiated into member 132 which is composed of a material that is microwave permeable and is impervious to fluid 107. The microwave energy passes through member 132 and is converted into thermal energy within fluid 107 in storage tank 100. It is to be understood that magnetrons 110 and 128 are cycled ON and OFF as a function of the fluid temperature in preheater chamber 98 and oil tank 100, respectively, in the manner previously described in connection with heating system 48.

Pump 104, for example an oil transfer pump, draws fluid 107 from tank 100 via a suction conduit 138 within the storage tank, a conduit 140, a gate valve 142, a check valve 144 and a T fitting 146. Fluid 107 is pumped through pump 104, a conduit 148, a T fitting 150, a check valve 152, a gate valve 154 and a conduit 156 into preheater chamber 98. The pumped fluid leaves preheater chamber 98 through an L-shaped conduit 158, a conduit 160 and flows through a discharge or feed line 162 into oil burner 102, conduit 160 and discharge line 162 being connected by a T fitting 164. Fuel oil 107 that is not used by oil burner 102 returns to storage tank 100 via a return line 166, a check valve 168, a conduit 170, a T fitting 172, a conduit 174, a T fitting 176, a gate valve 178, a T fitting 180, a conduit 182 and a return conduit 184 which is disposed within the storage tank. Preferably, return conduit 184 is positioned so that heated fluid 107 from oil burner 102 is discharged at the bottom of storage tank 100 near suction conduit 138.

When oil burner 102 is not operating, an oil relief valve 186 which is connected to the free arm of T fitting 164 opens at a predetermined pressure. In consequence, the heated fluid pumped from preheater chamber 98 to storage tank 100 via a conduit 188, relief valve 186 and a conduit assemblage 190 which is connected to the free arm of T fitting 172. A pump safety relief valve 192, which is connected through a T fitting 194 and a conduit assemblage 196 to the free arm of T fitting 180, is set at a higher pressure than relief valve 186. A preheater safety relief valve [198] *193*, which is set at a higher pressure than relief valve 186, is connected to the free arm of T fitting 194 via a conduit assemblage 200. When either pump relief valve 192 or preheater relief valve [198] *193* is actuated due to excessive pressure, fluid 107 is discharged directly into storage tank 100.

If oil burner system 94 is completely shut down for an extended period, it is necessary to heat a quantity of fuel oil 107 prior to its being fed to oil burner 102. In this case, gate valves 142 and 178 are closed and a gate valve 202 is opened, gate valve 154 is opened during normal operation of the system. Gate valve 202 is connected between the free arm of T fitting 176 and the free arm of T fitting 146, a check valve 204 positioned between gate valve 202 and T fitting 146. It will be readily apparent that with the gate valves in the condition just described, storage tank 100 is effectively by-passed and the fuel oil is circulated only in preheater chamber 98.

Figure 5:
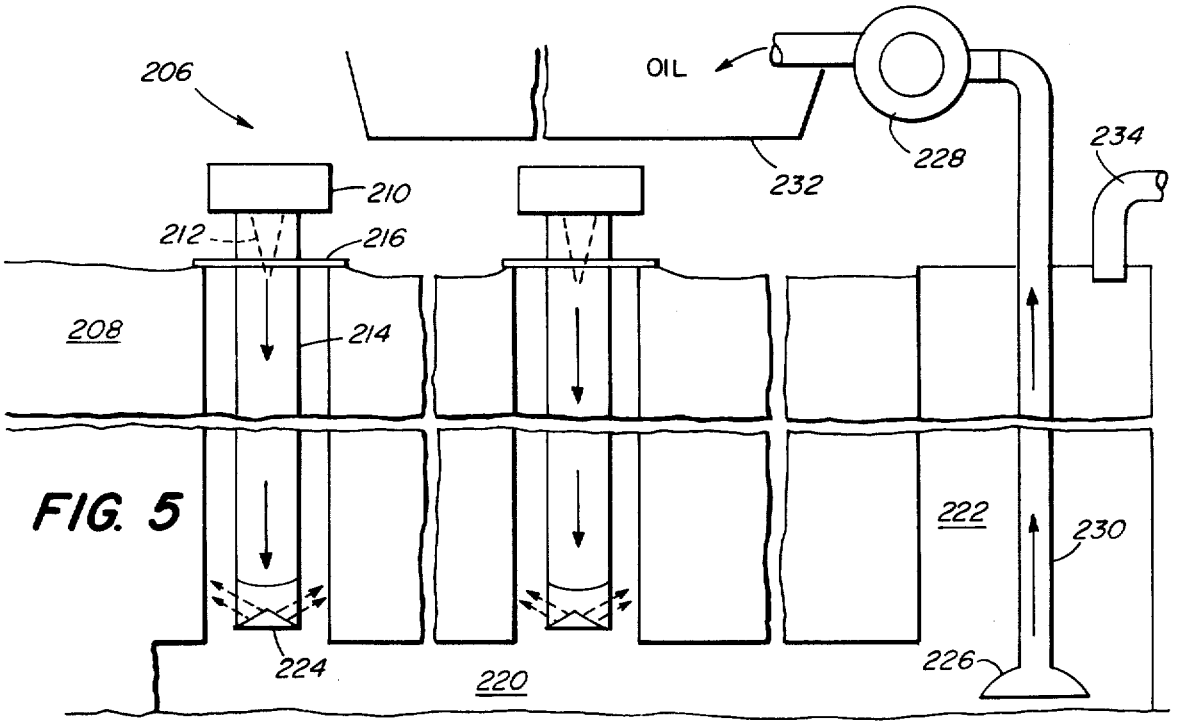
FIG. 5 is a [diagramatic] *diagrammatic* side elevation of a microwave heater system for on site removal of oil.

Referring now to FIG. 5, there is shown a system 206 for on site removal of oil and gas from a geological substrate 208, such as coal, shale, tar sands and existing wells by means of electromagnetic energy generated from a source 210, such as a magnetron. Microwave energy generated by magnetron 210 passes through a dielectric cone 212 into a hollow conduit 214, for example a galvanized steel or [aluminum] *aluminized* pipe, that is suspended from a reflective cover plate 216. Pipe 214 is positioned within an oversized hole 218 that intersects a tunnel 220 which connects with a main shaft 222. The microwave energy traveling down pipe 214 is deflected outwardly and upwardly by a deflector 224 which is suspended below pipe 214. As the microwave energy penetrates the [goelogical] *geological* formation, the oil contained therein is heated and flows into tunnel 220. As shown in FIG. 5, tunnel 220 is pitched so that the heated oil flows towards a [guard] *sump* 226 which is connected to a suction pump 228 via a conduit 230. The pumped oil is discharged into a storage tank 232. Gas escapes through a vent 234 which may be fitted with a [vacuum pump] *compressor* and storage tank.

In alternative embodiments of the invention, sources 18, 62, 110, *126* and 210 are other than magnetrons, for example solid state oscillators. Referring to FIG. [5] *6*, there is shown a solid state oscillator 236 for generating and amplifying microwave signals. Oscillators 236 includes an exposed copper stratum 244 on which there is superimposed a nickel stratum 242 and gold strata 240,238. A molybdenum stratum 246, a P+ silicon diffused stratum 248, an N silicon [expitxial] *epitaxial* stratum 250 and an N+ silicon substrate 252 are superimposed on stratum 238. A gold wire 254 is connected to a germanium-gold alloy stratum 256 on N+ silicon substrate 252. The operating frequency of sources 18, 62, 110, *126* and 210 is in the range of 300 megahertz to 300 gigahertz. Polyphase pulsing of the sources provides increased operating efficiency.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A heating apparatus comprising:

a. a source of electromagnetic energy;

b. container means in which a *hydrocarbon* fluid is confined, said container means having an inlet port and an outlet port through which said fluid flows;

c. means for directing said electromagnetic energy towards said confined *hydrocarbon* fluid, said means for directing including a horn which is disposed within said container means, *in sealing relationship therewith,* said horn *having a base and an apex with walls converging toward said apex from said base and* composed of a material that is impervious to said *hydrocarbon* fluid and is permeable to said electromagnetic energy, said electromagnetic energy *being* converted into thermal energy within said *hydrocarbon* fluid; and d. control means operatively connected to said source [for regulating the] *of* electromagnetic energy [and controlling the viscosity of said fluid by elevating its temperature] *for regulating the same in response to the temperature of said hydrocarbon fluid.*

2. A heating system comprising:

a. oil burner means;

b. a storage tank operatively connected to said oil burner means;

c. a preheater chamber operatively connected to said oil burner means and said storage tank;

d. said storage tank and said preheater chamber configured to contain a hydrocarbon fluid;

e. source means for generating electromagnetic energy; and f. means for directing said electromagnetic energy towards said fluid within said preheater chamber, said electromagnetic energy converted into thermal energy within said fluid for elevating the temperature of said fluid in said preheater chamber, said means for directing including a waveguide and a horn defining an open ended enclosure having an enlarged exit port through which said electromagnetic energy is transmitted, said preheater chamber formed with an opening corresponding to said exit port, a panel disposed between said exit port and said opening for sealing said open ended enclosure and said preheater chamber, said panel composed of a material that is impervious to said fluid and is permeable to said electromagnetic energy.

3. A method for heating a contained hydrocarbon fluid comprising the steps of:

a. generating electromagnetic energy *in the frequency range from of about 300 megahertz to about 300 gigahertz;* b. [coupling] *propagating* said electromagnetic energy through conduit means;

c. positioning deflection means *relative to said conduit means and* within a geological substrate[;], *which includes contained hydrocarbon fluid, for controlling the direction of deflection of substantially all of said electromagnetic energy propagated through said conduit means;* d. directing said electromagnetic energy [towards] *relative to said conduit means toward* said deflection means, said electromagnetic energy *thereby being* deflected [towards] *from said deflection means toward* said geological substrate;

[d.] *e.* releasing the contained hydrocarbon fluid by elevating the temperature of the hydrocarbon fluid with said electromagnetic energy which is converted into thermal energy within the *hydrocarbon* fluid; and

[e.] *f.* pumping said [released] hydrocarbon fluid *which as been released from said geological substrate* to a container.

4. The method as claimed in claim 3 including the step of inserting said conduit means into a geological substrate in which the hydrocarbon fluid is confined.

5. A heating apparatus comprising:

a. a source of electromagnetic energy;

b. a confined fluid having a viscosity in the approximate range of 350 to 10,000 seconds Saybolt Universal at 100° F.;

c. means for directing said electromagnetic energy towards said confined fluid, said electromagnetic energy converted into thermal energy within said fluid;

d. control means operatively connected to said source for regulating the electromagnetic energy and controlling the viscosity of said fluid by elevating its temperature; and e. container means in which said fluid is confined, said container means having an inlet port and an outlet port through which said fluid flows, said means for directing is disposed within said container means;

f. said means for directing including a horn having a substantially pyramidal profile, said horn disposed within said container means, said horn composed of a material that is impervious to said fluid and is permeable to said electromagnetic energy, abutting surfaces of said horn and said container means being sealed to prevent leakage of said fluid *from said container means.*

6. A heating apparatus comprising:

a. a source of electromagnetic energy;

b. a confined fluid having a viscosity in the approximate range of 350 to 10,000 seconds Saybolt Universal at 100° F.;

c. means for directing said electromagnetic energy towards said confined fluid, said electromagnetic energy converted into thermal energy within said fluid;

d. control means operatively connected to said source for regulating the electromagnetic energy and controlling the viscosity of said fluid by elevating its temperature; [and]

e. container means in which said fluid is confined, said container means having an inlet and an outlet port through which said fluid flows, said means for directing is disposed within said container means[.]*; and* f. said means for directing including a rectangular waveguide and a solid cone horn, said waveguide and horn constituting a sealed chamber, said electromagnetic energy introduced into said waveguide and [propogated] *propagated* towards an apex of said horn, said container means formed with an opening that is configured to snugly receive said means for directing, said waveguide mounted external to said container means and said horn mounted internal of said container means, seal means provided at the abutting surfaces of said means for directing and *said* container means.

7. The heating apparatus as claimed in claim 6 wherein said horn is composed of a dielectric material that is impervious to said fluid and permeable to said electromagnetic energy.

8. The heating apparatus as claimed in claim 7 wherein said fluid is a hydrocarbon fluid.

9. A heating system comprising:

a. oil burner means;

b. a storage tank operatively connected to said oil burner means;

c. a preheater chamber operatively connected to said oil burner means [on] *and* said storage tank;

d. a hydrocarbon fluid having a viscosity in the approximate range of 350 to 10,000 seconds Saybolt Universal [of] *at* 100° F. within said storage tank and said preheater chamber;

e. source means for generating electromagnetic energy; and f. means for directing said electromagnetic energy towards said fluid within said preheater chamber, said electromagnetic energy converted into thermal energy within said fluid for elevating the temperature of said fluid in said preheater chamber, said means for directing including a waveguide and a horn defining an open ended enclosure having an enlarged exit port through which said electromagnetic energy is transmitted, said preheater chamber formed with an opening corresponding to said exit port, a panel disposed between said preheater chamber, said panel composed of a material that is impervious to said fluid and is permeable to said electromagnetic energy.

10. The heating apparatus as claimed in claim 9 including means for directing said electromagnetic energy towards said fluid within said storage tank, said electromagnetic energy converted into thermal energy within said fluid in said storage tank for elevating the temperature of said fluid in said storage tank.

11. The heating apparatus as claimed in claim 10 wherein said source means includes a first magnetron for generating microwave energy which is directed towards said fluid in said preheater chamber and a second magnetron for generating microwave energy which is directed towards said fluid in said storage tank.

12. A method for heating a contained hydrocarbon fluid comprising the steps of:

a. generating electromagnetic energy *in the frequency range of about 300 megahertz to about 300 gigahertz*;

b. [coupling] *propagating* said electromagnetic energy through conduit means;

c. inserting said conduit means into a geological substrate in which the hydrocarbon fluid is confined;

d. positioning deflection means within said geological substrate *relative to said conduit means to control deflection of substantially all of the electromagnetic energy exiting from said conduit means*, said electromagnetic *energy being* directed [towards] *toward* said deflection means [and deflected thereby towards said geological substrate] *from said conduit means*;

e. [directing] *deflecting* said electromagnetic energy *in a direction substantially outwardly and upwardly from said deflection means* towards the contained hydrocarbon fluid[;] *in said geological substrate* f. releasing the [contrained] *contained* hydrocarbon fluid by elevating the temperature of the hydrocarbon fluid with said electromagnetic energy which is converted into thermal energy within the *hydrocarbon* fluid; and g. pumping said released hydrocarbon fluid *from said geological substrate* to a container.

*13. A method for heating hydrocarbon material to increase the fluency thereof, comprising the steps of:*

*a. generating electromagnetic energy in the frequency range of about 300 megahertz to about 300 gigahertz;*

*b. directing the electromagnetic energy through a waveguide toward the hydrocarbon material; and*

*c. converting the electromagnetic energy into thermal energy within the hydrocarbon material to elevate the temperature of the hydrocarbon material thereby increasing the fluency of the hydrocarbon material.*

*14. The method as claimed in claim 13, wherein the hydrocarbon material includes coal.*

*15. The method as claimed in claim 13, wherein the hydrocarbon material includes shale oil.*

*16. The method as claimed in claim 13, wherein the hydrocarbon material includes tar sand.*

*17. An electromagnetic heating apparatus for heating hydrocarbon material, comprising:*

*a. a source of electromagnetic energy for generating electromagnetic energy in the frequency range of about 300 megahertz to about 300 gigahertz;*

*b. a container for holding the hydrocarbon material;*

*c. coupling means for coupling the electromagnetic energy from said source of electromagnetic energy to the hydrocarbon material wherein the electromagnetic energy is converted into thermal energy within the hydrocarbon material to elevate the temperature of the hydrocarbon material thereby increasing the fluency of the hydrocarbon material.*

*18. The apparatus as claimed in claim 17, wherein the hydrocarbon material includes coal.*

*19. The apparatus claimed in claim 17, wherein the hydrocarbon material includes shale oil.*

*20. The apparatus claimed in claim 17, wherein the hydrocarbon material includes tar sand.*

*21. A method for recovering hydrocarbon fluid from a geological formation, comprising the steps of:*

*a. generating electromagnetic energy in the frequency range of about 300 megahertz to about 300 gigahertz;*

*b. directing the electromagnetic energy through a conduit toward the geological formation which includes the hydrocarbon fluid;*

*c. deflecting the electromagnetic energy exiting from the conduit to control its entry into the geological formation;*

*d. converting the electromagnetic energy into thermal energy within the hydrocarbon fluid to elevate the temperature of the hydrocarbon fluid thereby increasing the fluency of the hydrocarbon fluid; and*

*e. removing the hydrocarbon fluid subsequent to the converting step d.*

*22. A method for recovering oil and gases from oil shale, comprising the steps of:*

*a. generating electromagnetic energy in the frequency range of about 300 megahertz to about 300 gigahertz;*

*b. directing the electromagnetic energy through a conduit toward the oil shale;*

*c. deflecting the electromagnetic energy exiting from the conduit to control its entry into the oil shale;*

*d. converting the electromagnetic energy into thermal energy within the oil and gases present in the oil shale to elevate the temperature of the oil and gases thereby increasing the fluency of the oil and gases; and*

*e. removing the oil and gases from the oil shale subsequent to the converting step d.*

*23. A method for recovering oil and gases from tar sand, comprising the steps of:*

*a. generating electromagnetic energy in the frequency range of about 300 megahertz to about 300 gigahertz;*

*b. directing the electromagnetic energy through a conduit toward the tar sand;*

*c. deflecting the electromagnetic energy exiting from the conduit to control its entry into the tar sand;*

*d. converting the electromagnetic energy into thermal energy within the oil and gases present in the tar sand to elevate the temperature of the oil and gases thereby increasing the fluency of the oil and gases; and*

*e. removing the oil and gases from the tar sand subsequent to the converting step d.*

*24. A method for recovering hydrocarbon fluid from coal, comprising the steps of:*

*a. generating electromagnetic energy in the frequency range of about 300 megahertz to about 300 gigahertz;*

*b. directing the electromagnetic energy through a conduit toward the coal;*

*c. deflecting the electromagnetic energy exiting from the conduit to control its entry into the coal;*

*d. converting the electromagnetic energy into thermal energy within the coal to elevate the temperature of the coal thereby increasing the fluency of the coal; and*

*e. removing hydrocarbon fluid resulting from the coal due to steps a. through d.*

*25. A method of recovering hydrocarbon fluid from a geological substrate which includes the hydrocarbon fluid, comprising the steps of:*

*a. generating electromagnetic energy in the frequency range of about 300 megahertz to about 300 gigahertz;*

*b. directing the electromagnetic energy through a conduit toward the geological substrate;*

*c. releasing the hydrocarbon fluid from the geological substrate by elevating the temperature of the hydrocarbon fluid within the geological substrate by the action of the electromagnetic energy within the hydrocarbon fluid to increase the fluency of the hydrocarbon fluid; and*

*d. removing the released hydrocarbon fluid.*

*26. The method recited in claim 25, including the step of:*

*deflecting the generated electromagnetic energy that is directed toward the geological substrate.*

* * * * *